United States Patent [19]

Cardenas-Franco et al.

[11] Patent Number: 4,478,241

[45] Date of Patent: Oct. 23, 1984

[54] SOLENOID ACTUATED VALVE BLOCKS FOR GLASSWARE FORMING MACHINES

[75] Inventors: Luis Cardenas-Franco; Enrique Veazey-Menéndez; Jorge Alfredo Heredia-De-La-Paz, all of Monterrey, Mexico

[73] Assignee: Vitro-Tec Fideicomiso, Monterrey, Mexico

[21] Appl. No.: 330,918

[22] Filed: Dec. 15, 1981

[30] Foreign Application Priority Data

Dec. 16, 1980 [MX] Mexico .................................. 185295

[51] Int. Cl.³ ............................................ F16K 49/00
[52] U.S. Cl. ..................................... 137/340; 65/161;
137/338; 137/596.17; 137/625.65; 137/884
[58] Field of Search ................... 65/161, 163; 137/334,
137/338, 340, 596.16, 596.17, 625.65, 884

[56] References Cited

U.S. PATENT DOCUMENTS

| | | | |
|---|---|---|---|
| 2,157,480 | 5/1939 | Cole | 137/334 |
| 3,918,489 | 11/1975 | Foster | 137/884 X |
| 4,082,108 | 4/1978 | Dininio | 137/596.16 X |
| 4,100,937 | 7/1978 | Mallory | 137/596.16 |
| 4,162,910 | 7/1979 | Lining et al. | 65/161 X |

Primary Examiner—Gerald A. Michalsky
Attorney, Agent, or Firm—Sughrue, Mion, Zinn, Macpeak and Seas

[57] ABSTRACT

A valve block for glassware forming machines is rendered faster and more accurate by substituting, for the pilot air system, a plurality of solenoids directly coupled with the cartridge valves which handle the operational air, the major part of the bodies of said solenoids being arranged across the main operational air feed manifold to be cooled by the air passing therethrough, a closed chamber around the upwardly projecting ends of said solenoid valves, means for passing cooling air through said chamber, a plate for closing the lower ends of said valve chambers, and a plurality of manually actuatable push buttons in said lower plate to permit manual actuation of said cartridge valves. In order to facilitate removal of the cartridge valves for maintenance purposes, said valves are modified by removing the wider portion of their bodies and providing a section in the valve chamber of smaller diameter to engage the end plunger portion of the valve member.

8 Claims, 4 Drawing Figures

SOLENOID ACTUATED VALVE BLOCKS FOR GLASSWARE FORMING MACHINES

FIELD OF THE INVENTION

The present invention refers to a solenoid actuated valve block for glassware forming machines which is very compact, efficient and suitable for use in practically any glassware forming machine.

BACKGROUND OF THE INVENTION

As is well known, prior art valve blocks for glassware forming machines were devised to satisfy the control needs of the automatic machines which, working on the blow-blow or the press-blow method, effected sequentially a plurality of operations for the manufacture of glassware. Said valve blocks consisted in a metal block having suitable dimensions to be installed in the machine for the manufacture of glassware and contained a plurality of air valves which were in turn operated by pistons or like elements which, in turn, were operated by means of pilot valves mechanically actuated by the also well known timer drum, which was designed jointly with said machines to automatically and sequentially effect the necessary operations.

The air transmission system, however, was inefficient by virtue of the fact that the pilot valves actuated by the timer drum were located at considerable distances from the main valve block which fed the operational air to the various units and mechanisms of the machine, and by virtue of the fact that the pilot air is normally handled under low volume and high pressure in order to act on the pneumatic valves by means of pistons which have to overcome a lower pressure of the operational air which was handled at great volumes and, hence, this caused delays that, while being of some fractions of seconds, nevertheless constituted a serious disadvantage for an accurate operation of said machines, which work in a very fast manner. Therefore, many of the installations of glassware manufacturing machines were provided with timer drums directly installed on or near the main operational valve blocks, in order to actuate by means of cams, and in sequence, a series of pushers which mechanically operated the valves of said block so as to have a practically instantaneous response. All the prior art installations, using machines operated on the basis of the timer drum, that is, on the basis of operational mechanical cams, were therefore highly intricate and inefficient, because any wear of the mechanical moving parts or any change in the glassware forming process, caused considerable delays and overrides, which were very substantial from the point of view of the speed of operation of the machines and thus inadmissible, causing frequent stops in the machine to remedy the defects of the mechanically actuated movable elements of the valve block, inasmuch as the adjustment operation was difficult and dangerous for the operator because it was effected manually and with the machines working.

With the advent of electronic controls which replaced the traditional mechanical timing drum for mechanically actuating by means of a plurality of cams the pistons that in turn actuated the valves of the block of glassware manufacturing machines, the conditions of operation and efficiency of the process were greatly improved, inasmuch as it was then possible to have recourse to the use of solenoid valves actuated by means of electrical signals from the electronic timer control, in order to handle in the adequate sequence the various valves of the block of the machine, whereby the responses were more accurate and the traditional problem of undue wear of the cams of the drum or of the followers for operating the valves of the machine was avoided, whereby the number of stops for repairs and replacement was decreased considerably, which enabled the glassware manufacturing industry to increase the speed of operation of the glassware manufacturing machines operated by said valve blocks.

For instance, in U.S. Pat. No. 4,162,910, patented July 31st, 1979 to Ball Corporation, a device of this character is described, in which the plurality of mechanical air valves of the valve block of a glassware manufacturing machine, particularly of the well known I.S. type, was operated by means of a plurality of mechanical pusher pistons, integrated to a pneumatic pilot cylinder, for the reception of pilot air from a corresponding solenoid valve. A solenoid valve was provided for each piston and, consequently, for each individual valve of the block and these solenoids were actuated by means of electrical signals derived from the electronic timer control of the machine. The valve block of U.S. Pat. No. 4,162,910, while considerably improving the actuation as compared to the traditional timer drum, had as its sole purpose the substitution of said timer drum by means of a plurality of solenoid valves actuated by an electronic timer control. The principle of providing mechanical pusher pistons for pushing the actuators of the valve block was however preserved, said pistons having been incorporated in an additional block which contained a plurality of operational chambers for the pistons, which were arranged angularly with respect to the air ducts from the solenoid valves, whereby the arrangement was relatively intricate. It was also necessary to attach, to the already existing valve block in the glassware forming machine, an additional block of a considerable size, in which all the chambers for the pistons were contained as well as the tubes for feeding pilot air and for carrying pilot air towards the pistons operated by the solenoid valves which had also to be accommodated in the neighborhood of said block, thus rendering the installation and adaptation of said device to the existing glassware forming machines extremely difficult. As the operation of the valves of the block was still effected by mechanical means, namely, by pushers pneumatically actuated by the pilot air from the solenoid valves in accordance with the above explanation, said pushers had to be necessarily contiguously installed with the valve members of the block and aligned therewith, which caused numerous problems of installation which even led to severe modifications of the machines, whereby said technological advance had not a great acceptance. That is, in this particular instance an additional pusher piston block was necessary, said pistons being actuated by means of solenoids and being installed contiguously to the existing valve block, whereby, while the efficiency of operation was considerably improved with respect to the valve blocks actuated by the timer drum, this device did not solve the problem of providing a valve block which, when used in lieu of the prior art blocks, could be easily adaptable to any glassware forming machine of those existing in the market.

With the advent of the cartridge valve, which in short is a slidable plunger type valve comprising two inner chambers and a plunger, said plunger in a first position thereof communicating the two inner chambers with each other and said plunger in a second position thereof communicating one of said inner chambers with the exterior, the design of the valve blocks could be considerably improved, inasmuch as this type of cartridge valves, appropriately operated by means of pilot air, showed considerable advantages with respect to the mere pistons used in the valve blocks of the prior art, such as that described and claimed in the above mentioned U.S. Pat. No. 4,162,910. Therefore, the operation of the valve blocks for glassware forming machines was rendered more efficient and of more instantaneous response by virtue of the elimination of the purely mechanical operating valves, using instead pneumatical valves which are of faster and more accurate response than said mechanical valves and which, also, do not contain movable parts which may be easily worn out.

Therefore, in U.S. Pat. No. 4,082,108, patented Apr. 4, 1978 to Maul Technology Corporation, a valve block is described which uses the above mentioned cartridge valves, the plungers of which were actuated by means of pilot air controlled through solenoid valves mounted externally of the block, and said block valve of U.S. Pat. No. 4,082,108 was designed in such a way that the valve block contained two separate rows of valves, each of which was provided with chambers within which the cartridge valves operated. Through each row of valves there were associated an operational air feed manifold and an exhaust manifold for operational air, which were handled by the movement of the plungers of the cartridge valves in turn operated by means of the pilot air handled by the solenoid valves external to the valve block, whereby in a position of the plunger of the cartridge valve, the air of the operational air feed manifold passed towards the operational feed lines to the various parts of the machine, whereas in the other position of the plunger, said operational air lines were communicated with individual exhausts which were connected to the exhaust manifold of the valve block of said patent.

While the valve block of U.S. Pat. No. 4,082,108 considerably improved the efficiency of the valve blocks of the prior art, it still showed serious drawbacks in view of various causes, inter alia, that given the provision of two different manifolds for feeding operational air and two different exhaust manifolds for the operational air, it was necessary to space the two rows of valves of the block by a considerable distance, which increased the size of the block therefore rendering the same difficult to adapt to the existing machines, whereby certain elements of the machine had to be redesigned to accommodate the said valve block of a larger size in order to integrate the same to a glassware forming multiple station machine.

On the other hand, the provision of pilot air through solenoid valves installed externally of the valve block constituted a considerable disadvantage, in view of the fact that the pilot air lines had to be necessarily long and consequently the response of the cartridge valves to the pneumatic signal sent by the solenoid valves was not as instantaneous as desirable, thereby causing a lag of a number of fractions of a second which, in view of the high speed of these machines, was enough to create the need of dephasing the operation of the machine with respect to the signal in order to compensate for the delay in the signal.

On the other hand, the provision of pilot air control solenoid valves required an externally complex installation and this rendered the installation and the maintenance and operation of said valves more difficult to a considerable extent.

The above mentioned disadvantages of the valve blocks built with cartridge valve chambers were partially overcome by valve blocks in which the solenoid valves were integrally provided in the valve block, whereby the distance of travel of the pilot air was minimized and the resulting signal was practically instantaneous. Thus, for instance, in U.S. Pat. No. 3,918,489, patented Nov. 11, 1975 to Emhart (UK) Limited and equivalvent to British patent No. 1,415,012 also to Emhart (UK) Limited, a valve block is described which operates with cartridge valves introduced in chambers within the block and having a corresponding plurality of solenoid valves arranged in an additional device integrated to the block, in order to decrease to a considerable extent the distance that the pilot air must move from its source, through the solenoid valve and towards the expansion chamber of the cartridge valve, whereby an instantaneous pilot signal was secured, thereby overcoming the drawbacks shown by the prior art valve blocks, including those described in U.S. Pat. No. 4,082,108, even when the latter were developed after the valve blocks of U.S. Pat. No. 3,918,489. Despite the fact that the valve block of U.S. Pat. No. 3,918,489 is a very compact and practical valve block which satisfactorily solves almost all the problems presented by the prior art blocks, said valve block still shows certain disadvantages, particularly in connection with the arrangement of its elements, in view of the fact that in said valve block it is still necessary to maintain two totally spaced valve rows with an exhaust manifold inbetween and, in connection with the operational air inlets to the cartridge valves, these inlets are normally individual or at most depend from two inner but separate manifolds, which force said block to be relatively large. This affected the practicality of the block to be used in lieu of other valve blocks in the majority of glassware forming machines.

As to the pilot solenoid valves which are integrated to the block itself, said valves, in view of a manual piloting device which they must contain, angularly arranged with respect to said solenoid valves, required considerable room whereby the pilot air block had to be very thick, thus increasing the cost of manufacture of the block and rendering its installation in reduced spaces difficult. Also, the pilot air channels had to be necessarily long and consequently wider, which produced a higher air comsumption and a deficiency as to the instantaneous characteristic that the pilot signal must have in order to operate the cartridge valve so as to obtain an instantaneous response in the operational air, inasmuch as the various mechanisms of a glassware manufacturing machine must be moved at accurate times and with extremely high speeds, thus requiring a considerable accuracy in the pilot signal, which is not obtainable with the design of the valve block of U.S. Pat. No. 3,918,489. The provision of separate operational air inlets, or the provision of an air inlet manifold with two plenums or exhaust manifolds, also caused the volume of the valve block of this patent to be considerable, which together with the considerable size that the pilot air block must have, produced a very bulky and heavy valve block, not adaptable in practice to many existing glassware forming machines. On the other hand, the spacing between the two rows of valves contained by the block of U.S. Pat. No. 3,918,489, rendered it difficult to enclose the solenoid valves within a pressurized chamber to avoid any pollution by dust or fumes and the like, which caused a deficient performance of the solenoid valves with the consequent stops or delays in the machines. The arrangement of the handles for manual actuation of the solenoid valves, at right angles with respect thereto and at a different face of the block, was also a considerable disadvantage. Also, said manual actuating mechanisms were, in the device of the above patent, very cumbersome and inefficient and slow to be handled by the operator, which caused inefficiency situations when the operator was unable to move the actuator with sufficient speed to open or close the solenoid valves at a given time.

All the above mentioned problems shown by the prior art valve blocks have been duly solved by a valve block which is described in copending U.S. patent application Ser. No. 330,919, filed in the name of the same applicants on the same date hereof and claiming priority on Mexican patent application No. 185,294 filed Dec. 16, 1980, which shows a highly improved valve block, acting in a similar manner, that is, under the same basic principles of the valve block of U.S. Pat. No. 3,918,489 (or British patent No. 1,415,012) which carries out its functions with a highly increased efficiency and without showing the problems shown by the valve block of the above mentioned patents. In effect, said U.S. copending application mentioned above describes a valve block that is constructed by having two staggered rows of valve chambers within which the respective cartridge valves operate, and said block comprises a block having only one single operational air feed manifold, said manifold having a generally rectangular cross-section and extending along the length of said valve block, whereby the valve chambers open on one side of said manifold directly without the need of intermediate conduits which would cause pressure drops, said chambers opening at their other ends on one outer face of the valve block. Said valve chambers are provided by means of an intermediate block which is attached to the above mentioned block or primary block, wherein said chambers are suitably provided by means of bores that directly open towards the manifold and towards the outer face of the block. Of course, suitable conduits are also provided in this intermediate block to connect each one of said valve chambers with the exterior of the block. A secondary block is also provided directly attached to said intermediate block, on which a plurality of solenoid valves also arranged in a staggered array are provided, with a pair of conduits or manifolds for feeding pilot air running along the secondary block and a plurality of very thin and short conduits for pilot air towards the expansion chamber of the cartridge valves, said secondary block or pilot air block being thin in order to shorten the length of the path to be travelled by the pilot air. The sclenoid valves of said improved block are of very small capacity by virtue of the fact that only an opening signal must be transmitted to the valve in order to feed pilot air into the cartridge valve chamber, and this arrangement provides shorter pilot air paths as well as a smaller air consumption, also securing an instantaneous signal in view of the short distance that the pilot air must travel and in view of the fact that the operational air is directly communicated from the manifold connecting the same to the respective valve chambers which contain the cartridge valves, which provides for a flow of air without any appreciable pressure drop towards the various mechanisms of the machine, each one of which is connected by means of the well known needle valve system with each one of the valve chambers of the block of said invention. The above, besides achieving a practically instantaneous response of the mechanisms with respect to the time in which electrical signals are received through the solenoid valves, also provides a very compact block which is adaptable to any type of glassware manufacturing machine and, also, said block may be manufactured by modification of already existing blocks by means of small adaptations which do not require the exercise of intricate techniques or the use of high labor.

While the block of the above mentioned copending U.S. application totally solves the problems presented by the prior art blocks, it still requires the installation of a pilot air system which, regardless of its efficiency, causes a delay, however small, whereby the signal is not quite instantaneous, and it has been the purpose of the workers in the art to seek a device which, without losing the safety and accuracy of the pilot air systems, may replace the same with advantages by improving the instantaneous characteristic of the signal.

BRIEF SUMMARY OF THE INVENTION

Having in mind the defects of the prior art valve blocks, it is an object of the present invention to provide a solenoid actuated valve block for glassware forming machines which will be very compact and will have all of its elements duly integrated, and which will be susceptible of adaptation, with very few modifications, to the majority of the existing glassware forming machines.

It is one other object of the present invention to provide a valve block of the above mentioned character, which will be of a very simple and compact construction and yet of a high efficiency as to the provision of a practically instantaneous signal.

One other and more particular object of the present invention is to provide a valve block of the above mentioned character which will be fully actuated by means of solenoids directly coupled to the pneumatic cartridge valves, thus avoiding the necessity of a pilot air system in its entirely.

One other object of the present invention is to provide a valve block of the above mentioned character which will be extremely compact by not having more than one single air manifold therewithin.

An additional object of the present invention is to provide a valve block of the above mentioned character in which the cartridge valves may be manually actuated by manually operated devices that are integrally contained in the actuating solenoids and in aligned positions with said valves.

One other object of the present invention is to provide a valve block of the above mentioned nature, in which the pilot air system will be avoided in its entirety in order to secure an absolutely instantaneous pilot signal.

One other and more particular object of the present invention is to provide a valve block of the above mentioned character, in which the valves are actuated by solenoids the major parts of which are within the main air manifold to be thereby efficiently cooled.

Still another object of the present invention is to provide a valve block of the above mentioned character, which will be easy to maintain and repair by providing specially shaped cartridge valves of easy removal characteristics.

The foregoing objects and others ancillary thereto are preferably accomplished as follows:

In accordance with a preferred embodiment of the invention, a valve block for glassware forming machines is rendered faster and more accurate by substituting, for the pilot air system, a plurality of solenoids directly coupled with the cartridge valves which handle the operational air, said coupling being effected by mechanically coupling the piston rods of said solenoids to the plungers of said cartridge valves at the interior part of the block where the valve chambers housing said cartridge valves open to a main operational air feed manifold, the major part of the bodies of said solenoids being arranged across said main manifold to be cooled by the air passing therethrough and the remaining part of the body of said solenoids projecting upwardly of the upper face of said block, a closed chamber around the projecting ends of said solenoid valves, and means for passing cooling air through said chamber, the lower face of said block being covered by a plate for closing the lower ends of said valve chambers, and a plurality of manually actuatable push buttons being provided in said lower plate to permit manual actuation of said cartridge valves.

In order to facilitate removal of the cartridge valves for maintenance purposes, said valves are modified by removing the wider portion of their bodies and providing a section in the valve chamber of smaller diameter to engage the end plunger portion of the valve member, whereby extraction of the whole cartridge may be easily effected through the upper face of the valve block.

BRIEF DESCRIPTION OF THE DRAWINGS

The novel features that are considered characteristic of the present invention are set forth with particularity in the appended claims. The invention itself, however, both as its organization and its method of operation, together with additional objects and advantages thereof, will best be understood from the following description of specific embodiments, when read in connection with the accompanying drawings, in which:

Figure 1:
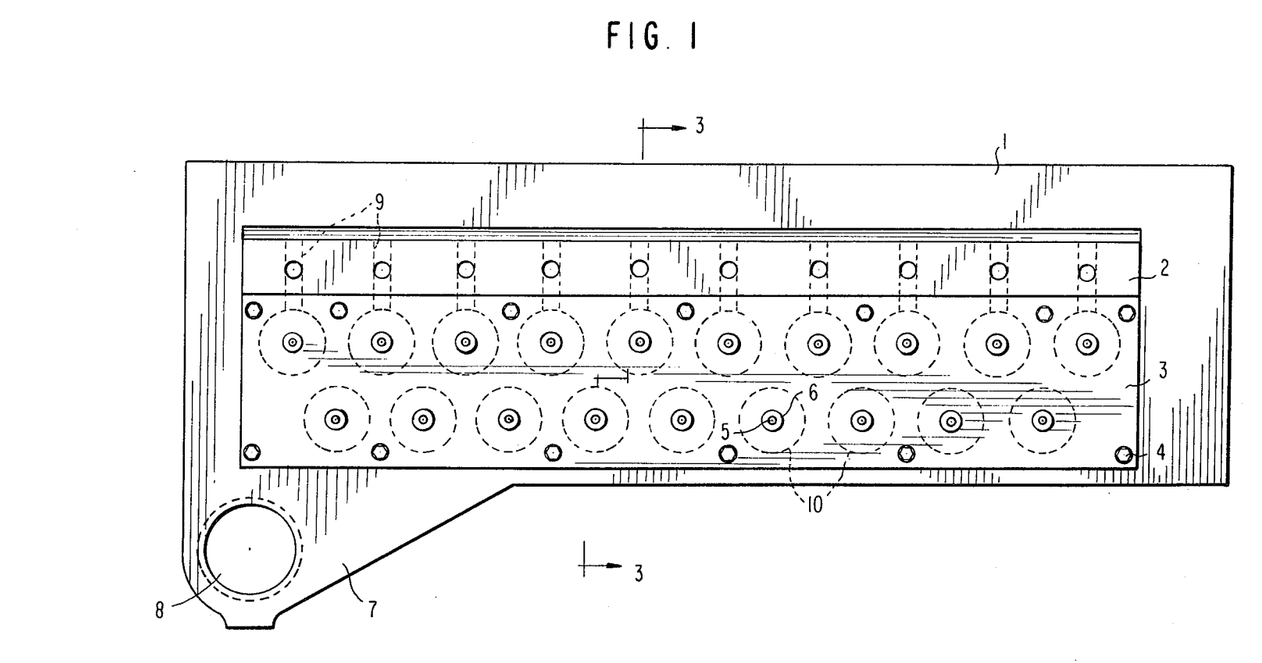
FIG. 1 is a bottom plan view of a valve block built in accordance with the present invention.
Figure 2:
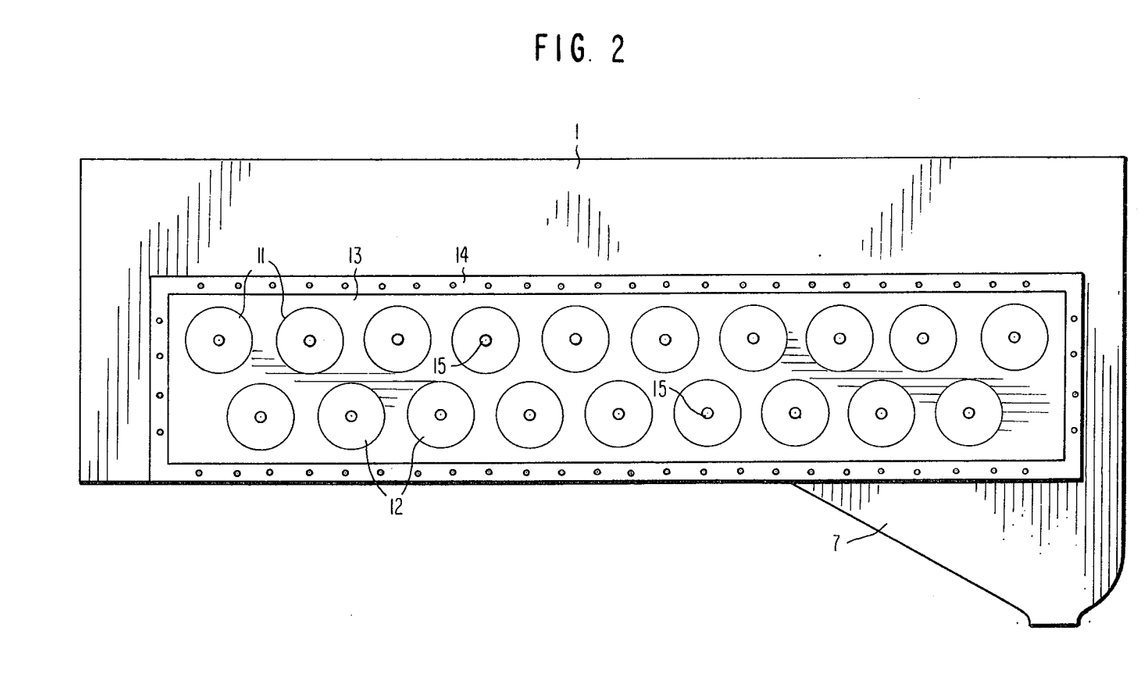
FIG. 2 is a top plan view of the valve block showing the arrangement of the solenoid valves.

Having now more particular reference to the drawings and more specifically to FIGS. 1 and 2 thereof, there is shown a valve block built in accordance with a preferred embodiment of the present invention, which comprises a metal block 1 containing therewith, suitably machined, all the necessary channels for communicating each one of the valves with the operative lines of a glassware forming machine, such as the well known type IS machine, to which lower face a block 2 is attached for providing the exhausts of the various valves and under which is attached, by means of fasteners 4, a manual pilot plate 3 on which all the buttons for manual piloting are provided mounted in bushings 6 as will be described in more detail hereinbelow, in order to manually operate the cartridge valves in accordance with the description that will be given hereinbelow.

Block 1 has, at its lower left corner as shown in FIG. 1 of the drawings, a projection 7 in which the main inlet for operational air 8 is provided for feeding air to the main operational air manifold which will be described below.

At the exhaust block 2, a plurality of bores 9 are provided to operate as individual exhaust ducts for the valve chambers which will be described hereinbelow, all of which may be connected to a manifold adjacent the block and not shown for clarity of the illustration of the invention, but which may be attached on one side of plate 3 and under the block 2 in order to constitute a general air exhaust which receives the individual exhausts of ducts 9 of block 2 as will be easily understood by any expert in the art.

As can be more clearly seen in FIG. 3 of the drawings, within block 1 there is provided a manifold, preferably of rectangular shape, indicated by means of reference numeral 16, extending along the length of said block 1 and communicating by means of a suitable duct with the main air feed duct 8, for the purpose of feeding operational air to all the valve chambers 10 containing the cartridge valves which will be described hereinbelow and, within said block 1, suitable outlet ducts for operational air to the glassware manufacturing machine are provided, as indicated by means of the reference numeral 35, with secondary ducts 36 for constituting a pneumatic control system with retention needle valves as is well known in the art, whereby it is not considered necessary to more fully describe said control circuit, which is a very well known one.

Figure 3:
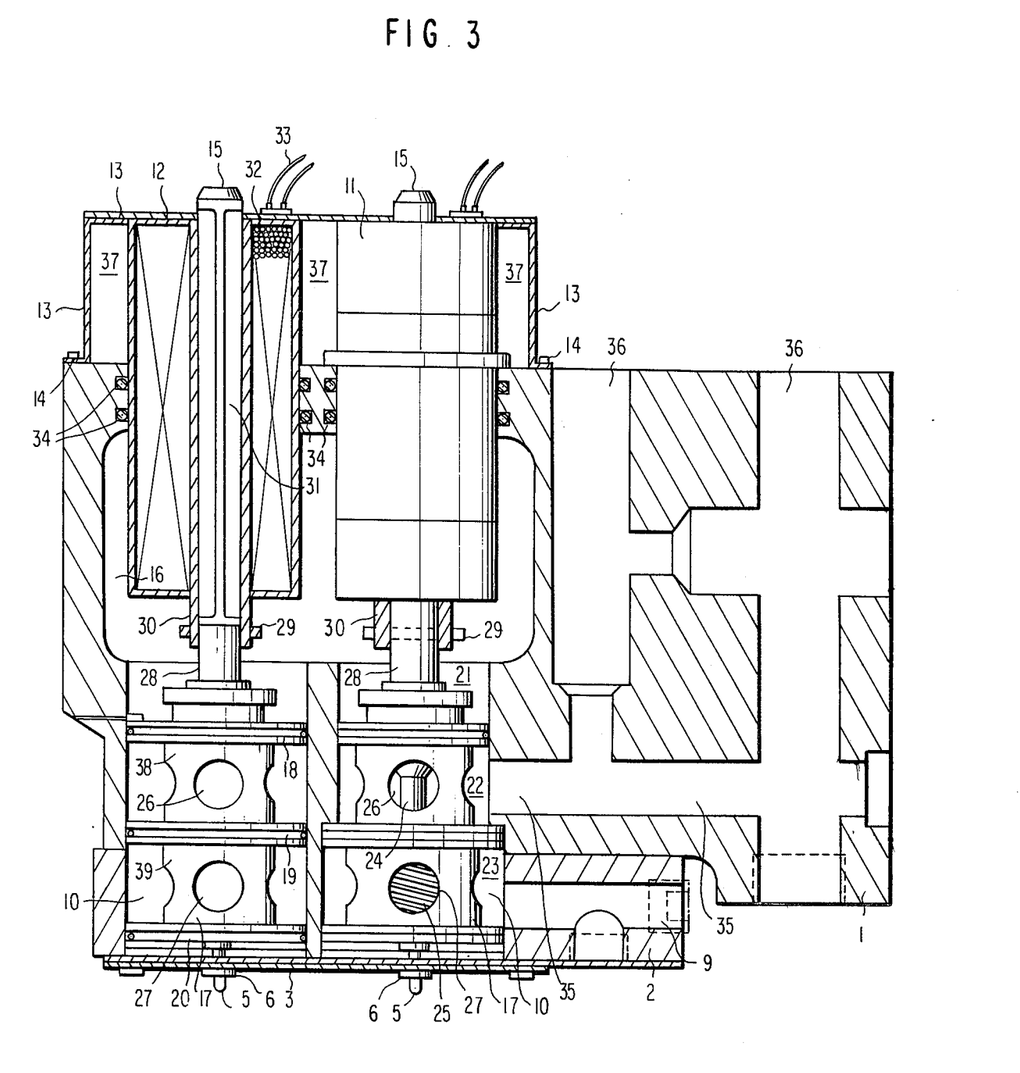
FIG. 3 is a cross-sectional view taken along lines 3—3 of FIG. 1 and looking in the direction of the arrows, in order to show the arrangement of the cartridge valves and their interrelation with the solenoids.

The solenoids 11 and 12 as shown in FIGS. 2 and 3 of the drawings, are arranged on the block 1 at its upper face in two parallel rows, each solenoid 11 being arranged between each pair of solenoids 12 and conversely, thereby constituting a staggered array of the two solenoid lines 11 and 12 which minimizes the space occupied by the valves, thus permitting the construction of a very compact valve block which solenoids 11 and 12 may be fully housed in a chamber 37 for cooling the same, formed by a sheet housing 13 which is tightly attached to the block by means of a peripheral flange 14.

As more clearly shown in FIG. 3 of the drawings, the solenoids 11 and 12 are respectively aligned with the chambers 10 within which respective cartridge valves 17 operate, to handle the operational air which is fed through the main manifold 16 and enters into chambers 10 to be handled by said cartridge valves 17 and sent to the respective outlets 35, 36 for operational air and towards the respective air exhausts 9 to the exterior of the block 2.

As shown in FIG. 3 of the drawings, each chamber 10 of the block 1 has incorporated therein a cartridge valve 17 which essentially comprises a narrow cylindrical body 38 and a wide cylindrical body 39, arranged one above the other and from which annular flanges 18, 19 and 20 project outwardly, flange 18 being situated at the upper end of the valve 17 which opens into the manifold 16 for feeding operational air, the intermediate flange 19 dividing the two bodies 38 and 39 and flange 20 being contiguous to the chamber formed besides plate 3 which has the manual actuators as will be described below, thus dividing chamber 10 into an inner chamber 21 communicating directly with manifold 16, an intermediate chamber 22 communicating with ducts 35, 36, for feeding operational air to the mechanisms of the glassware forming machine and an outer chamber 23 which communicates with the exhaust ducts 9 for operational air. In order to tightly isolate each one of chambers 21, 22 and 23 into which each valve chamber 10 is divided, valve 17 has respective circumferential channels at the periphery of flanges 18, 19 and 20, for accommodating suitable O-ring packings which perfectly seal each one of said chambers from each other.

Each cartridge valve, which is of very well known construction, is provided with a stem 24 terminating at the end directed toward the main manifold 16, in a guide stem 28 which is directly coupled by means of a bolt 29 to the end 30 of the movable member of each solenoid 11 and 12, generally indicated by means of reference numberal 31 in FIG. 3 of the drawings, in order to operate the valve by means of said movable member 31 of the solenoid. The stem 24 of each cartridge valve 17 has two plugs (not shown) interiorly arranged in bodies 38 and 39, respectively, the plug corresponding to body 38 in the normal position of each cartridge valve 17, that is, when the valve 17 is pushed upwardly as seen in FIG. 3 of the drawings by means of the helical spring 25, plugging an intermediate opening in plate 18 of the valve, whereby to isolate chambers 21 and 22 from each other and one other plug which, in said other position, opens the opening contained centrally of the plate 19, therefore intercommunicating chambers 22 and 23 for a purpose which will be more clearly described in what follows. Each body 38 and 39 of the cartridge valves is provided with a plurality of circumferentially distributed openings 26 and 27, respectively, for the purpose of accomplishing communication between the various chambers as will be described in connection with the operation of the device of the present invention.

The solenoids which are mounted on the upper face of the block 1, have their bodies suitably introduced in bores 50 provided at said upper face and are fastened in position by means of suitable packing glands 34, thereby projecting through the main operational air feed manifold 16 until they are confronted with the cartridge valves 17 as clearly illustrated in FIG. 3 of the drawings. The electromagnetic winding 32 of each solenoid 11 or 12, actuates on a movable member 31 which at its outer end has a hollow stem 30 for engaging, in accordance with what was described above, by means of the bolt 29 the guide member 28 of each cartridge valve 17, whereby both the valves and the solenoids are mechanically directly coupled so that, when each solenoid 11 or 12 is actuated by the introduction of current signals through leads 33 from the electronic timer control of the machine, the movable member 31 of said solenoids will be pushed outwardly, thereby pushing the guiding member 28 of the stem 24 of each cartridge valve, with which a valve will open as will be more fully described hereinbelow.

The solenoids are housed, in the part which projects outwardly of block 1, within a sheet housing 13 attached to the upper part of the block 1 by means of flange 14, thus forming a plenum 37 through which cooling air may be circulated. The solenoids, which in the particular case of the present invention must be of a suitable power to move mechanically the cartridge valves 17 against the air pressure circulating through manifold 16, are additionally cooled by the air circulating through said operational air manifold 16. whereby a very efficient operation is accomplished in view of the fact that said valves are never overheated, because they are efficiently cooled, at their outer part, by air circulating through chamber 37 and at their inner part, by air continuously circulating through the operational air feed manifold 16, said valves being continuously exposed to said air streams as may be clearly seen in FIG. 3 of the drawings.

Through plate 3 of the block of the present invention, a plurality of push buttons 5 is provided, having slidable rods through bushings 6, as more clearly illustrated in FIG. 3 of the drawings, said rods 5 being mechanically coupled with the plunger at the lower end of valve 17 and coupled to the stem 24, whereby manual operation buttons for the cartridge valves are provided in order to permit, when it is desired to open any one of the valves at the will of the operator, that the latter merely presses one of the buttons 5 corresponding to the valve desired, with which the stem 24 of said valve will be pushed upwardly, thus effecting the opening operation. The return of the valve is secured in view of the spring 25 contained thereby, and hence buttons 5 need only be push buttons in order to accomplish a full manual operation of the valves. However, the solenoids 11 and 12 also have, in the interior of their movable hollow member 31, manual operational buttons 15 which, in the particular case of the present invention, may be used to close any one of the cartridge valves 17 in the remote instance that the latter jams in its open position, whereby suitable safety devices for the valve block built in accordance with the present invention are secured.

Figure 4:
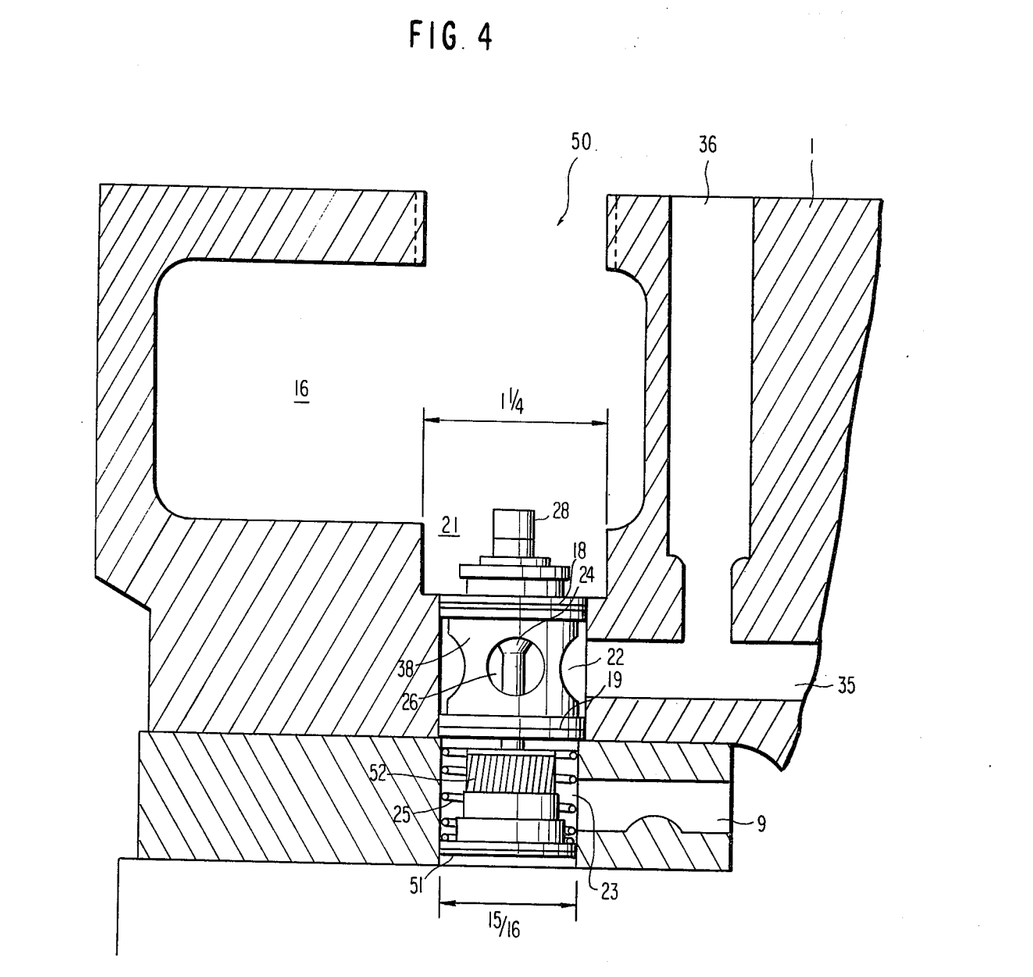
FIG. 4 is a view similar to that shown in FIG. 3, but showing a modified cartridge valve built in accordance with another embodiment of the present invention.

As clearly shown in FIG. 4 of the drawings, in order to facilitate the maintenance and replacement operations in the valve block of the present invention, a preferred embodiment of the invention comprises the provision of specially shaped cartridge valves and specially shaped valve chambers therefor. As shown in FIG. 4, the lower portion 17 of the body of the cartridge valve is completely removed from the valve and the portion 23 of the valve chamber is machined to a smaller diameter, so that the plunger 51 of the valve tightly engages the wall of chamber 23 for isolating the same with respect to the environment. The stem 24, plug 52, spring 25 and plunger 51 of the valve are not modified in any respect, whereby cartridge valves available in the market may be easily modified by the mere removal of part 17 of the body.

As will be apparent from the illustration of FIG. 4, by thusly modifying the cartridge valves and the corresponding valve chambers, said valves may be removed from the block through the openings 50 at the upper face thereof, by using a tool to engage the end 28 of the valve stem. In order to provide sufficient room for said tool (not shown), the portion 21 of the valve chamber is broadened by machining or the like, as shown in FIG. 4 of the drawings, whereby a stepped valve chamber 21, 22, 23 is provided, with the diameter thereof decreasing from section 21 to section 22 and to section 23, thereby greatly facilitating removal of the cartridge valves for repair or replacement purposes.

Having in mind the assembly of solenoids and cartridge valves in accordance with the present invention, the operation of the instant valve block is as follows: When a solenoid, for instance, solenoid 11, receives an electrical signal from cables 33 operated by the signals of the electronic timer control of the machine, the same is actuated by means of the winding 32 and pushes the stem 24 of the cartridge valves downwardly as seen in FIG. 3 of the drawings. When the stem 24 is pushed downwardly, the operational air manifold 16 is communicated, through chamber 21, openings 26 of body 38 and chamber 22, with the operational air ducts 35 which carry the air to the various pneumatic circuits of the glassware manufacturing machine, therefore actuating the mechanism associated with the cartridge valve in particular. When the electrical signal to the solenoid 11 ceases, the latter releases the cartridge valve, whereby the strength of spring 25 pushes stem 24 to its normal position illustrated in FIG. 3 of the drawings, and communication between said chambers 21 and 22 is interrupted, whereas at the same time communication is opened between chambers 22 and 23, whereby the air which was in the ducts 35 and 36 pneumatic lines of the machine, returns to chamber 22 through openings 26 of body 38, through the opening in the plate 19, then through openings 27 of body 39 and hence to chamber 23 and outwardly to the exhaust ducts 9 of the valve block, thereby permitting the termination of the actuation of the mechanism related with valve 17.

It may be seen from the above that the provision of a plurality of solenoids 11 and 12 having suitable power, mechanically coupled to the plurality of cartridge valves 17 of the valve block of the present invention, renders it unnecessary to provide a pilot air system, inasmuch as said piloting is electro-mechanically accomplished, that is, by means of the direct push of a solenoid on the stem of the cartridge valve, whereby the response accomplished by the electro-mechanical pilot system produces a practically instantaneous response in said cartridge valves which, being in turn connected to the common operational air manifold 16 by means of chambers 21 which are extremely short, render it possible to force the operational air to enter directly to the ducts carrying the same to the operational and pneumatic control lines of the machine, whereby also in a practically instantaneous manner the accurate actuation of the machine as to initiation and termination times is accomplished in the various mechanisms of the glassware manufacturing machine which are related to each chamber 10 of the valve block built in accordance with the present invention.

The integration of block 1 with staggered solenoids 11 and 12 also renders it easy to form, in a very short space, a closed chamber 37. Said solenoids may be arranged within the manifold 16, as well as within a chamber exterior to the block itself, whereby the solenoids will therefore be in a practically inert atmosphere and will also be efficiently cooled by the air streams which pass through said chamber and manifold.

The block in accordance with a preferred embodiment of the present invention illustrated in the accompanying drawings, on the other hand, is of a very compact nature and may be built by simple adaptation of blocks already existent for IS type machines, which work under mechanical actuation and, therefore, it is also suitable for adaptation to any other machines such as Owens, Emhart, la Haye and Fama without any problem. Hence the block built in accordance with the present invention, with its staggered valves and its exhaust systems integrated in a very thin block attached to the main block, as well as with its electromechanical piloting system, results in a very versatile device.

Although in the above certain specific embodiments of the present invention have been shown and described, it is to be understood that many modifications thereof are possible. The present invention, therefore, is not to be restricted except insofar as is necessitated by the prior art and by the spirit of the appended claims.

We claim:

1. A solenoid actuated valve block for glassware forming machines, which comprises the combination of a metal block provided with an inner longitudinal operational air manifold; a plurality of valve chambers arranged in a staggered array and opening towards a lower surface of said metal block at one of their ends and towards said operational air manifold at the other one of their ends; a plurality of cartridge valves arranged within said valve chambers, each chamber having a duct for operational air individually connected with a pneumatic operative line of the machine and an exhaust duct arranged at 90° thereto and opening to the atmosphere; a plate cover attached to said lower surface of said metal block to cover said valve chambers, said plate being provided with a plurality of manual pilot push buttons which are situated under each one of said valve chambers at one of the ends and having a pushing rod which is coupled to one end of a plunger of each cartridge valve for manual operation thereof; a plurality of solenoids arranged through bores provided in an upper face of said metal block and crossing said operational air manifold, said solenoids having a piston coupled with the opposite end of the plunger of each cartridge valve for actuation thereof; and a closed chamber on the upper face of said metal block and housing all the solenoids to form a cooling manifold therefor.

2. A valve block according to claim 1 wherein said metal block is a flattened rectangular elongated block along which and near its upper surface, said longitudinal inner operational air manifold is provided, the latter being a duct having an elongated rectangular cross-section, said valve chambers directly opening towards one of the wide faces of said duct, in order to enable an instantaneous admission of operational air into the valves.

3. A valve block according to claim 2 wherein said exhaust ducts are integrally provided in a flattened block attached to the lower surface of said metal block, between the latter and the plate containing the manual pilot buttons, said block having bores in the direction of the width of the block forming the exhaust ducts and bores in the direction of the thickness of the block forming the lower ends of the valve chambers, whereby said chambers will be directly connected with each one of the exhaust ducts in order to provide an immediate response.

4. A valve block according to claim 3 wherein each one of said cartridge valves arranged within the valve chambers of the metal block are provided with a guiding stem for securing a linear displacement, said guiding stem being directly coupled to the piston of each solenoid for actuation thereof by mechanical coupling, each one of said solenoids being transversely arranged to said operational air feed manifold and fixed on the upper face of said metal block by means of suitable packing glands to secure additional cooling thereof by the operational air flowing through said manifold.

5. A valve block according to claim 4 wherein said solenoids are of sufficient power to provide a mechanical actuation for opening and closing the cartridge valves, said solenoids being fed with amplified electrical current and having manual operational push buttons to enable closure of the cartridge valves by the machine operator.

6. A valve block according to claim 5 wherein said manual push buttons for the cartridge valves each comprises a push button arranged in the lower plate of the metal block and at the center of each of said cartridge valves, said push button having a sliding rod pushing the stem of the cartridge valves for manual opening thereof.

7. A valve block according to claim 6 wherein a rectangular tight box-like cover is attached to the upper face of said metal block, for forming a closed chamber which houses all of said solenoid valves, and means for injecting a cooling fluid in order to cooperate with the operational air in the maintenance of said valves at a low temperature.

8. A valve block according to claim 7 wherein said operational air feed manifold running along the primary block is provided with an integral duct opening to the upper face of the metal block, whereby to facilitate its connection to an external source of operational air.

* * * * *